United States Patent [19]

Kagohata et al.

[11] Patent Number: 4,757,944

[45] Date of Patent: Jul. 19, 1988

[54] CONTROL APPARATUS OF AIR CONDITIONER FOR AUTOMOBILES

[75] Inventors: Tsuneo Kagohata, Ibaraki; Reijiro Takahashi; Akira Tezuka, both of Katsuta; Toshikazu Ito, Ibaraki, all of Japan

[73] Assignee: Hitachi, Ltd., Tokyo, Japan

[21] Appl. No.: 33,234

[22] Filed: Apr. 2, 1987

[30] Foreign Application Priority Data

Apr. 2, 1986 [JP] Japan .................................. 61-76101

[51] Int. Cl.⁴ .......................................... G05D 23/00
[52] U.S. Cl. ..................................... 236/91 F; 236/49; 237/2 A; 165/42
[58] Field of Search ......................... 236/91 F, 49, 13; 237/2 A; 165/42, 32, 40, 41; 62/43

[56] References Cited

U.S. PATENT DOCUMENTS 4,538,760  9/1985  Kobayashi ........................... 237/2 A
4,562,954  1/1986  Kajita ................................... 237/2 A
4,681,153  7/1987  Uchida ................................. 237/2 A

*Primary Examiner*—Henry A. Bennet
*Attorney, Agent, or Firm*—Antonelli, Terry & Wands

[57] ABSTRACT

A control apparatus of an air conditioner for automobiles comprises: means for calculating a room temperature difference signal; means for calculating a reference blowout temperature; means for correcting the reference blowout temperature, thereby calculating a target blowout temperature; and means for controlling the heat exchanger such that the difference between the target blowout temperature and the actual blowout temperature becomes zero. This control apparatus can always maintain and manage the blowout air temperature at which the passenger can feel most comfortable for various ambient temperature conditions.

2 Claims, 4 Drawing Sheets

CONTROL APPARATUS OF AIR CONDITIONER FOR AUTOMOBILES

BACKGROUND OF THE INVENTION

The present invention relates to an air conditioner for automobiles and, more particularly, to a control apparatus of an automatic air conditioner for automatically controlling a room temperature.

For example, as shown in Japanese Patent Unexamined Publication No. 59-70218, in the conventional automatic air conditioner, as shown in FIG. 5, the temperature of the blowout air from the air conditioner is controlled on the basis of a room set temperature $T_S$, an insolation amount $Z_c$, an outside air temperature $T_a$, and the like so as to make an actual room temperature $T_R$ coincide with a room target temperature $T_{so}$ by calculating the room target temperature $T_{so}$ as the optimum room temperature under those outside air temperature and insolation amount.

In such a conventional automatic air conditioner, the very comfortable temperature control can be realized in the air conditioning of a wide space such as in a building. However, there is a drawback such that the comfortable temperature control cannot be always derived in the air conditioning of the narrow room of an automobile. This drawback is caused because of the following conditions which are peculiar to the rooms of automobiles.

(1) The room space of the automobile is very narrow and the blowout port of the air conditioner is arranged at the position which is very close to the body of the passenger (including the driver). Thus, the temperature distribution in the whole room is not uniform and the ratio that the passenger directly receives the blowout air from the air conditioner is high.

(2) Under the condition of a large heat load such as in the summer season, winter season, or the like, the incident amount or radiation amount of the heat through window glasses and the like is very large and the temperature gradient in the room is large. (For example, under the condition of the summer season, although the side surface of the body of the passenger on the window glass side is hot, the side surface on the opposite side is comfortable, and the like.)

(3) In many cases, the direct rays of the sun which enters from the window glass are directly irradiated onto the upper half body of the passenger, so that the passenger feels the partial heat.

In consideration of the foregoing conditions, a correlation between the comfortableness of the passenger and the change in temperature in each portion in the room was measured under various conditions. Thus, it has been found that the blowout air temperature when the passenger feels most comfortable after the room temperature was stabilized is almost unconditionally determined in correspondence to the outside air temperature and insolation amount, but the temperature at each of the representative points in the room in this state is not always constant.

SUMMARY OF THE INVENTION

It is an object of the present invention to provide a control apparatus of an air conditioner for automobiles in which the blowout air temperature at which the passenger can feel most comfortable can be always maintained and controlled under various ambient temperature conditions.

According to the invention, the air conditioning is controlled so as to satisfy the following three states.

First, in order to keep the comfortableness in the state of the stabilized room temperature:

(1) The outside air temperature $T_a$ is detected and a comfortable blowout target temperature $T_{do1}$ in the case where the insolation amount is zero is obtained for the outside air temperature $T_a$ (the blowout target temperature $T_{do1}$ is determined by the experiments).

(2) The insolation amount $Z_c$ is detected and the target temperature $T_{do1}$ is corrected to a lower value in accordance with the insolation amount $Z_c$, thereby obtaining the correction blowout target temperature $T_{do2}$ (the correction amount is also decided by the experiments; this correction is unnecessary with respect to the portions such as floor blowout portion and the like which do not directly receive the direct rays of the sun).

Second, in order to improve the response speed in the transient state and to correct the temperature difference of each passenger, the difference $\Delta T_r$ between the room set temperature $T_S$ and the detected room representative point temperature $T_R$ is calculated.

$$\Delta T_r = T_S - T_R$$

In accordance with the value of $\Delta T_r$, the target temperature $T_{do2}$ is set to a higher value when $\Delta T_r$ has a positive value and $T_{do2}$ is set to a lower value when $\Delta T_r$ has a negative value, thereby obtaining the actual blowout target temperature $T_{do}$.

Third, the actual blowout temperature $T_D$ is detected and a heat exchange amount of the air conditioner is controlled such that the value of $T_D$ always coincides with the actual blowout target temperature $T_{do}$ obtained.

The correction blowout target value $T_{do2}$ obtained as a function of the outside air temperature $T_a$ and insolation amount $Z_c$ corresponds to the blowout temperature in the state of the stabilized room temperature, namely, when the air in the room was sufficiently cooled (or heated) after the elapse of the enough time after the air conditioning had been started. In the ordinary running of an automobile, the automobile generally runs in the above state and, therefore, the comfortableness is considered to be most important in this region. The room representative point temperature $T_R$ is not always coincident with the set temperature $T_S$ because the blowout temperature is forcedly managed. However, since the temperature of the blowout air which is directly come into contact with the passenger is always controlled to the optimum temperature on the basis of the ambient condition, the passenger can obtain the very comfortable circumstances.

On the other hand, the room temperature is extremely high (or low) in the transient state until the room temperature is stabilized, for example, just after the engine was started or the like after the automobile had been parked under the blazing sun. Therefore, it is necessary to promptly cool (or heat) the inside of the room irrespective of the blowout target temperature $T_{do2}$. For this purpose, in the transient state, i.e., in the region of the large difference $\Delta T_r$ between the room set temperature $T_S$ and the room representative point temperature $T_R$, the actual blowout target temperature $T_{do}$ needs to be temporarily reduced (or increased). As mentioned above, by continuously correcting the correction blowout temperature $T_{do2}$ in response to the value of $\Delta T_r$ including the positive or negative sign thereof, the actual blowout temperature $T_{do}$ can be smoothly changed from the transient state at the start of the air conditioning until the final stabilized state.

On the other hand, it is known that there is more or less a width of the absolute value of the comfortable temperature in dependence on the personal feeling or the difference of nationality (Japanese, American, and the like). For the person who prefers a low blowout temperature, by setting a low set temperature $T_S$, the value of $\Delta T_r$ increases in the negative direction and the blowout target temperature $T_{do}$ decreases, so that the actual blowout temperature $T_d$ also decreases in response thereto. Even in the stabilized state of the room temperature, the fluctuation of the blowout target temperature $T_{do}$ remains by only the amount of the value corresponding to the change amount of $T_S$ due to the balance of the heat amount. Therefore, by changing the set temperature $T_S$, only the absolute temperature of the blowout temperature can be adjusted without changing the relative blowout temperature response characteristic.

Further, in general, the blowout temperature of the air conditioner for automobiles remarkably varies due to various factors even when an adjustment amount of the heat exchange is set to be constant. The factors of such a variation include the temperature of cooling water of the engine as a heat source, engine rotational speed which is proportional to the rotational speed of the compressor, intake air temperature of the air conditioner, change in blowout air, and the like. However, the actual blowout temperature $T_{do}$ obtained as described above needs to be always maintained. For this purpose, a blowout temperature sensor is attached to the blowout port of the air conditioner. By adjusting the heat exchange amount of the air conditioner so that the detected temperature $T_D$ always coincides with the actual blowout temperature $T_{do}$, the comfortable blowout target temperature $T_{do}$ can be maintained and managed independently of those variation factors.

In this manner, the invention intends to improve the conventional control system in which the room temperature $T_R$ is made coincident with the room target temperature $T_{so}$. Instead of this system, the invention intends to make the blowout air temperature $T_D$ from the air conditioner coincide with the comfortable blowout target temperature $T_{do}$, so that the following conditions which caused the problems in the conventional automatic air conditioner can be solved.

(a) Even after the room temperature was sufficiently reduced in the summer season, the temperature at the representative point in the room is maintained. Thus, the low blowout temperature is continued and the passenger feels unpleasant by the cold air in the portion of the passenger with which the cold blowout wind is come into contact.

(b) On the contrary to the above item (a), in spite of the fact that the room temperature is comfortable in the winter season, only the floor area is very hot since the warm air directly comes.

DESCRIPTION OF THE PREFERRED EMBODIMENT

An embodiment of the present invention will be described hereinbelow.

Prior to describing the embodiment of the invention, an air conditioner (hereinafter, abbreviated to an air-con) which is used in the invention and its operation and display panel will be first explained with reference to FIGS. 1 and 2.

Figure 1:
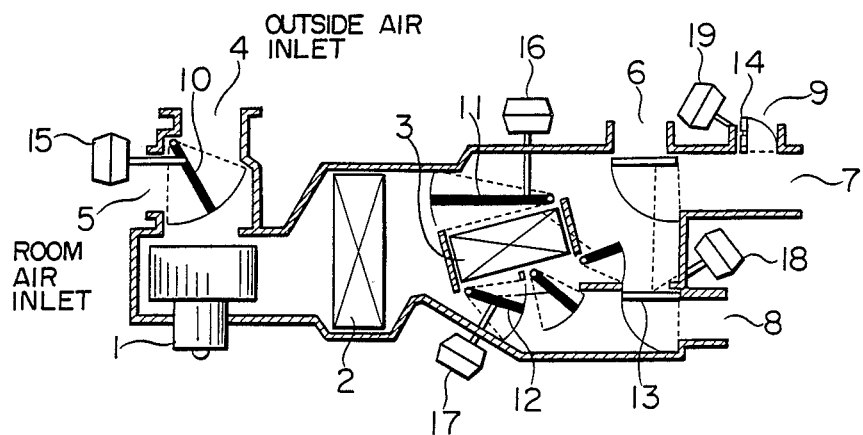
FIG. 1 is a cross sectional schematic diagram showing an air conditioning unit in an embodiment of the present invention.

In FIG. 1, reference numeral 1 denotes a blower motor to blow out the wind; 2 is an evaporator to cool the air; 3 a heater core to heat the air; 4 an outside air inlet; 5 a room air inlet of an automobile; 6 a defroster blowout port; 7 a ventilation blowout port; 8 a floor blowout port; and 9 a driver blowout port to preferentially blow out the wind to the driver side.

On the other hand, numeral 10 denotes an inside/outside air switching (INTAKE) door; 11 is a ventilation side (VENT) air-mix door; 12 a floor side (FLOOR) air-mix door; 13 a defroster side switching (DEF) door; and 14 a driver priority door. The doors 10 to 14 are opened or closed by negative pressure actuators 15 to 19 connected thereto, respectively. Therefore, by controlling the actuator 15, the inside/outside air can be switched. By controlling the actuators 16 and 17, the blowout temperature can be controlled. Further, by controlling the actuators 18 and 19, the blowout port can be switched to the defroster side or to the driver priority blowout port side, respectively.

Figure 2:
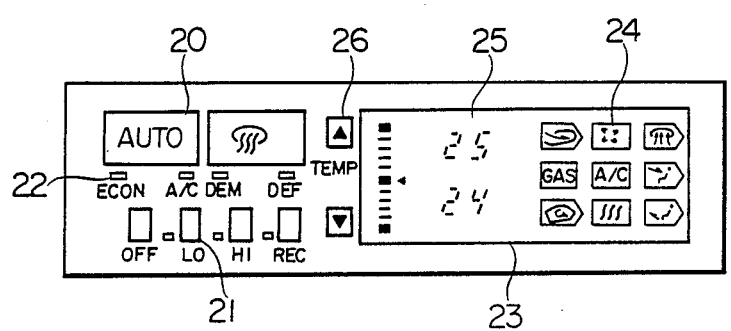
FIG. 2 is an external view of an operation panel of an automatic air conditioner.

On the other hand, in FIG. 2, reference numeral 20 denotes (two) push button switches to switch the operating mode of the air-con; 21 shows (four) push button switches to perform various kinds of switching operations; 26 indicates (two) push button switches to select a set temperature; 22 an indicator lamp to indicate each operation; and 23 an indicator section consisting of a temperature indicator section 25 (to display the set temperature and the outside air temperature) arranged on the left side and an air flow indicator section 24 arranged on the right side. By pressing each push button, the function of the air-con corresponding to the indication of the push button pressed is selected. The functions of the various kinds of change-over switches are as follows. In the case of the switches 21, there are the functions to stop the air-con, to fix a low wind amount, to fix a high wind amount, and to circulate the inside air in accordance with this order from the left side. In the case of the switches 26, the increase in the set temperature is selected by the upper switch and the decrease in the set temperature is selected by the lower switch. On the other hand, the air flow indicator section 24 indicates the operation of the air intake port, blowout port, compressor, water cock, or the like by lighting on the lamp in correspondence to the state of each of these apparatuses.

Figure 3:
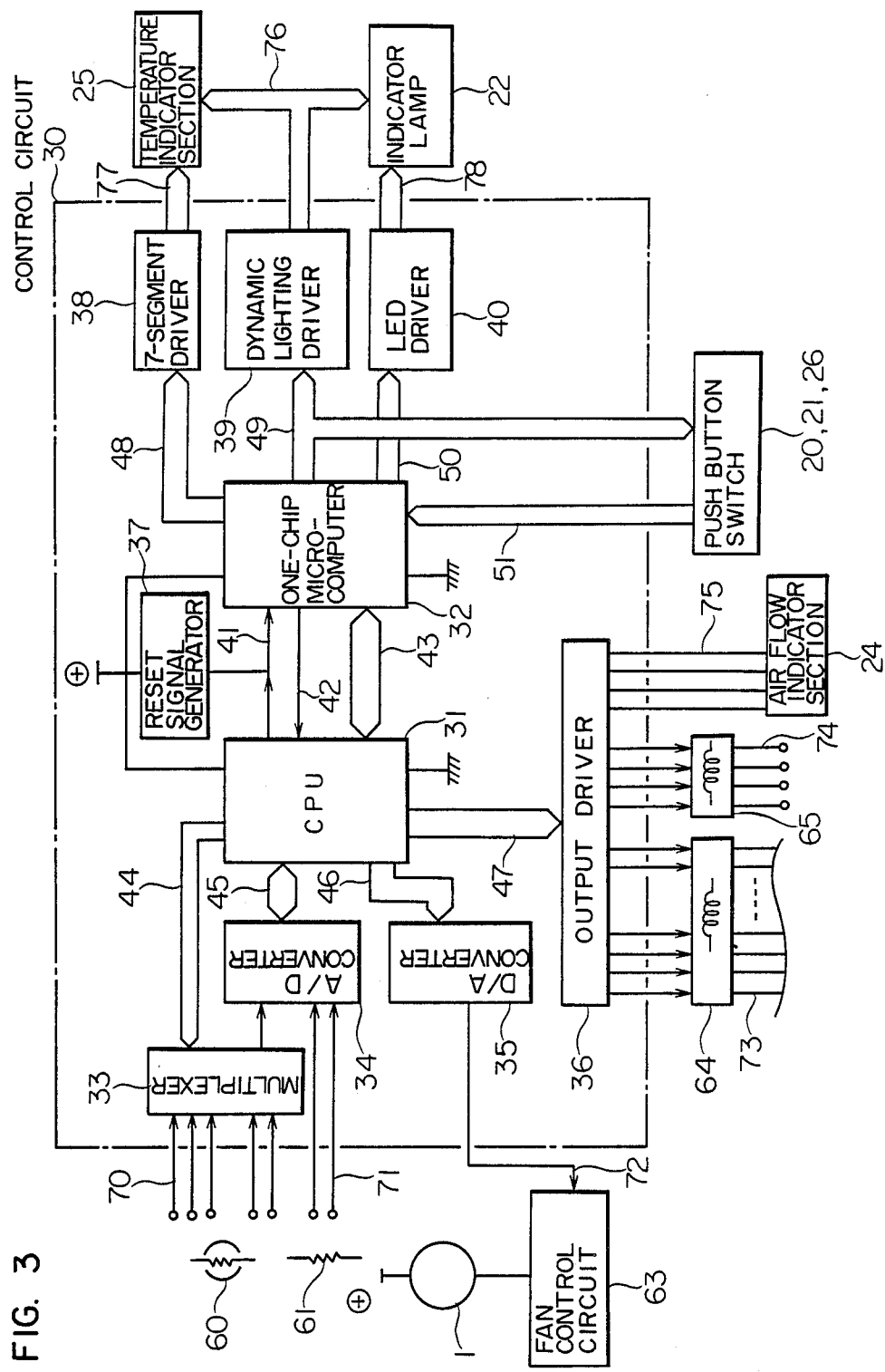
FIG. 3 is a block diagram showing an air conditioner control circuit using a microcompouter.

An embodiment of the invention to control the foregoing air-con system will now be explained with reference to FIG. 3. In FIG. 3, reference numeral 30 denotes a control circuit including a microcomputer; and 31 and 32 are one-chip microcomputers each of which is constituted by a CPU, a ROM, a RAM, I/O ports, a timer, a counter, and the like. A multiplexer 33 selectively transmits the input analog signal voltage designated to an A/D converter 34 through signal lines 44. The A/D converter 34 converts the signal from the multiplexer 33 or other analog signals which are input through signal lines 71 into the digital data and supplies to the microcomputer 31. In this embodiment, the A/D converter having a resolution power of 8 bits is used. A D/A converter 35 converts the 4-bit digital signal which is output from the microcomputer 31 into the stepwise analog signal, thereby forming the wind amount control voltage (analog signal of 0.6 to 4.0 V). An output driver 36 has a function to amplify the output control signal from the microcomputer 31 to the current of the level enough to drive a negative pressure valve or relay. A reset signal generator 37 generates a signal to reset the microcomputer 32 when the power supply was turned on or the power source voltage abnormally decreased. A 7-segment driver 38, a dynamic lighting driver 39, and an LED driver 40 dynamically light on the temperature indicator section 25 and indicator lamp 22 connected to these drivers in a three-split indicating manner. The respective drivers 38 to 40 operate in the following manner. The block to be indicated among the three-split display functions is selected by the driver 39. At the moment of this selection, the display signal corresponding to the selected block is supplied to the temperature indicator section 25 through the driver 38 and is also transmitted to the indicator lamp 22 through the LED driver 40. The foregoing operations are time-sequentially repeated and each display operation is executed. On the other hand, three signal transmission lines 44 are used for selection of an address of the multiplexer. Eleven signal transmission lines 45 are used for input/output of the A/D converter. Four signal transmission lines 46 are used for output of the D/A converter. Seventeen signal transmission lines 47 are used for control outputs and consist of nine lines for the negative pressure valve, four lines for the relay, and four lines for the indicator lamps. One signal transmission line 41 and one signal transmission line 42 are used for reset signals. Ten signal transmission lines 43 are used for data communication. Fourteen signal transmission lines 48 are used for temperature display. Three signal transmission lines 49 are used for dynamic lighting. Four signal transmission lines 50 are used for the indicator lamps. Three signal transmission lines 51 are used to input nine ON/OFF signals from the push button switches 20 and 21 through a switch matrix. In the diagram, following apparatuses are connected to the outside of the control circuit 30: (eight) temperature sensors 60 to detect the temperatures of the inside and outside of the room of the automobile; (two) feedback potentiometers 61 to control the opening degree of the air-mix door; a fan control circuit 63 to control the rotational speed of the blower motor 1; a negative pressure valve 64 to convert the voltage signal into the negative pressure signal; a relay 65 to turn on/off the power supply of the external apparatus; the push button switches 20, 21, and 26 to set the inputs of the air flow indicator section 24; the temperature indicator section 25; the indicator lamp 22; and the like.

With the foregoing constitution, predetermined arithmetic operations are executed on the basis of the temperature signals of the respective portions from the temperature sensors 60, air-mix door opening degree signals from the feedback potentiometers 61, and set signals from the push button switches 20 and 21. The output signal to control the opening degree of each door and the ON/OFF signal of the water cock are supplied through the negative pressure valve 64. The ON/OFF signals of the compressor and defroster are supplied through the relay 65. The comfortable control in the room is performed by controlling the blowout air amount and the like through the fan control circuit 63. At the same time, the temperatures of the respective portions and the operating state of the air-con are displayed by the indicator panel section 23.

Figure 4:
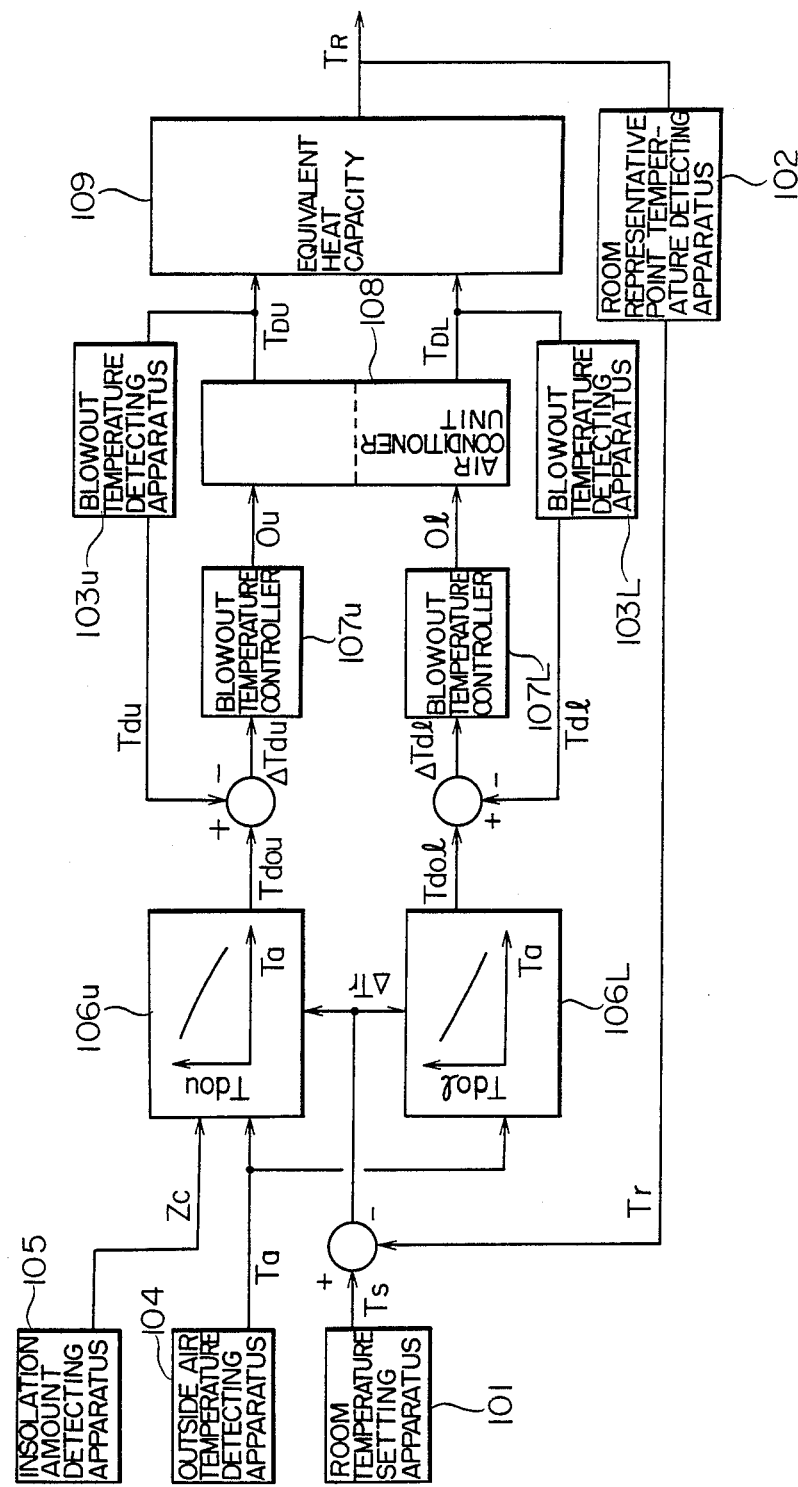
FIG. 4 is a block circuit diagram of a control apparatus showing an embodiment of the invention.
Figure 5:
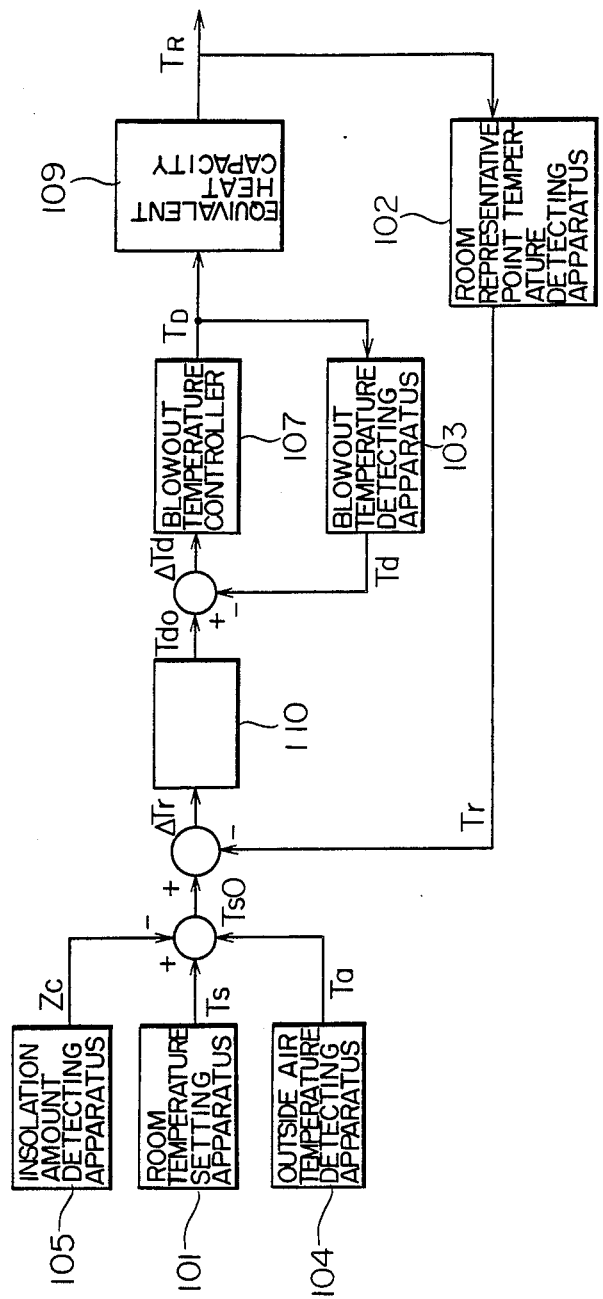
FIG. 5 is a block circuit diagram showing a conventional automatic air conditioner control system.

An embodiment of the invention will now be explained on the basis of the foregoing constitution with reference to FIG. 4. In FIG. 4, a room temperature setting apparatus 101 corresponds to the push button switches 26 shown in FIGS. 2 and 3. A room representative point temperature detecting apparatus 102, blowout temperature detecting apparatuses 103U and 103L, and an outside air temperature detecting apparatus 104 in FIG. 4 correspond to parts of the temperature sensors 60. On the other hand, an insolation amount detecting apparatus 102 detects the intensity of illumination of the insolation by a photodiode. The detection signal of the detecting apparatus 105 is input to the microcomputer 31 through a part of input terminals 70 in FIG. 3. The functions of blowout target temperature calculating apparatuses 106U and 106L are executed by the programs in the microcomputer 31. The functions of blowout temperature controllers 107U and 107L are executed by a part of the negative pressure valve 64, which operates under the control of the programs. The apparatuses 106U and 106L are corresponding to the block 110 in FIG. 5. The blowout target temperature calculating apparatus 110 calculates the blowout target temperatures which is need for making the room temperature conform with the target temperature. Reference numeral 108 denotes an air conditioner unit shown in FIG. 4 and 109 is an equivalent heat capacity in the room. The reasons why the blow temperature detecting apparatus 103, blowout target temperature calculating apparatus 106, and blowout temperature controller 107 are respectively constituted by two apparatuses and the air-con unit 108 is divided into two parts are because the room in the automobiles is divided into upper and lower areas and can be respectively independently operated to thereby maintain the cool temperature in the driver's head area and the warm temperature in the floor area.

Examples of numerical expressions in the respective arithmetic operation control processes in the block diagram shown in FIG. 4 are as follows.

$$\Delta T_r = T_S - T_R \quad (1)$$

$$\begin{cases} T_{dou} = f_U(T_a) - K_1 \times Z_c + K_2 \times \Delta T_r & (2) \\ T_{dou} = f_L(T_a) + K_2 \times \Delta T_r & (3) \end{cases}$$

$$\Delta T_{dx} = T_{dox} - T_{dx} \quad (4)$$

$$\theta_x = K_3 \times \Delta T_{dx} + K_4 \int \Delta T_{dx}\, dt + K_5 \quad (5)$$

where,
$K_1$ to $K_5$: constants
t: time
x: U or L
$f_U(T_a)$ in the expression (2) and $f_L(T_a)$ in the expression (3) are the functions to obtain the comfortable blowout target temperature $T_{do1}$ to the outside air temperature $T_a$ in the case where the insolation amount is zero. These functions are obtained by the experiments and have almost similar curves irrespective of the type of vehicles, male and female, and the like. In this embodiment, in order to cool the driver's head area and to warm the floor area, $f_U(T_a)$ is smaller than $f_L(T_a)$ and the comfortable blowout target temperature $T_{dol}$ decreases with an increase in outside air temperature. In general, when the outside air temperature $T_a = 20°$ C., the values of $f_U(T_a)$ and $f_L(T_a)$ are set to $f_U(T_a) \approx 15°$ C.

$f_L(T_a) \approx 30°$ C.

When comparing the expressions (2) and (3), the term of $-K_1 \times Z_c$ is included in only the expression (2). This is because of the following reasons. The upper half body which is expressed by the expression (2) is influenced by the insolation amount $Z_c$. Therefore, by reducing the target blowout temperature $T_{do}$ in response to the insolation amount $Z_c$, the comfortable conditions are obtained. However, there is no need to consider the influence by the insolation in the case of the floor area. The expression (2) corresponds to the calculating process of the blowout target temperature calculating apparatus 106U on the upper side. The expression (3) corresponds to the calculating process of the blowout target temperature calculating apparatus 106L on the lower side (floor area).

The expression (5) corresponds to the calculating processes of the blowout temperature control apparatuses 107U and 107L. However, in the embodiment, in order to set the stationary difference between the blowout target temperature $T_{dou}$ and the actual blowout temperature $T_D$ to 0 to thereby completely realize the comfortableness, the PI (proportion, integration) control system in the automatic control is used as will be understood from the expression (5).

As will be appreciated from the above description, particularly, in the stabilized state of the room temperature at which the comfortableness is important, the confortable blowout temperature state is decided by the outside air temperature $T_a$ and insolation amount $Z_c$. The signal indicative of the room representative point temperature $T_R$ is merely used as auxiliary means to mainly raise the response speed of the air conditioner. Therefore, it is sufficient that the accuracy of the detected temperature and the response speed in the temperature detection are low.

In the embodiment, in spite of the fact that the temperatures in the upper and lower areas are independently adjusted so as to cool the head area and to warm the floor area, one room representative point temperature sensor can be commonly used for the upper and lower areas due to the foregoing conditions. Therefore, there is an effect such that one room temperature sensor can be omitted as compared with the conventional system in which the temperatures in the upper and lower areas are independently adjusted.

As described above, according to the invention, in the stabilized state of the room temperature, the comfortable blowout temperature which is determined by the outside air temperature and insolation amount is always obtained and it is possible to eliminate the unpleasant feeling which is caused since the too cold wind is continuously come into contact with the passenger in the summer season and the inconvenience such that only the floor area is locally hot in the winter season. On the other hand, since the blowout temperature is corrected in accordance with the level of the difference between the set temperature and the room representative point temperature, in the transient state just after the start of the air conditioner, the maximum cooling-/heating capability of the air-con is effectively used. The response speed to the comfortable state in the room is improved. It is possible to also freely cope with the difference of the personal comfortable blowout temperature by changing the set temperature.

According to the invention, there are the following secondary effects.

(1) A degree of freedom of the set position of the room representative point temperature sensor is increased.

(2) The aspirator to improve the response speed is unnecessary.

As described above, the invention has the following effects. The blowout air temperature at which the passenger feels most comfortable can be always maintained and managed for various ambient conditions. It is possible to provide the automatic air conditioner which can give the comfortableness to the passenger under every condition.

We claim:

1. A control apparatus of an air conditioner for automobiles, comprising:

a temperature setting apparatus;

an outside air temperature detecting apparatus;

a room representative point temperature detecting apparatus;

a blowout temperature detecting apparatus;

an insolation amount detecting apparatus;

first means for comparing a set temperature signal from said temperature setting apparatus with a room temperature signal from said room representative point temperature detecting apparatus, thereby calculating a room temperature difference signal;

second means for calculating a reference blowout temperature on the basis of an outside air temperature signal from said outside air temperature detecting apparatus;

third means for correcting said reference blowout temperature on the basis of the room temperature difference signal calculated by said first means or on the basis of said room temperature difference signal and an insolation amount signal from said insolation amount detecting apparatus, thereby calculating a target blowout temperature; and fourth means for comparing a signal indicative of said target blowout temperature with a blowout temperature signal from said blowout temperature detecting apparatus, thereby changing the heat exchanging capability of the air conditioner such that the difference between the target blowout temperature and the blowout temperature approaches zero.

2. A control apparatus according to claim 1, wherein said first means includes an adder, said third means includes a blowout target temperature calculating apparatus, and said fourth means includes a blowout temperature control apparatus and an adder.

* * * * *